2 Sheets—Sheet 1.
J. W. HAWLEY.
Apparatus for Transferring Power.
No. 204,568. Patented June 4, 1878.
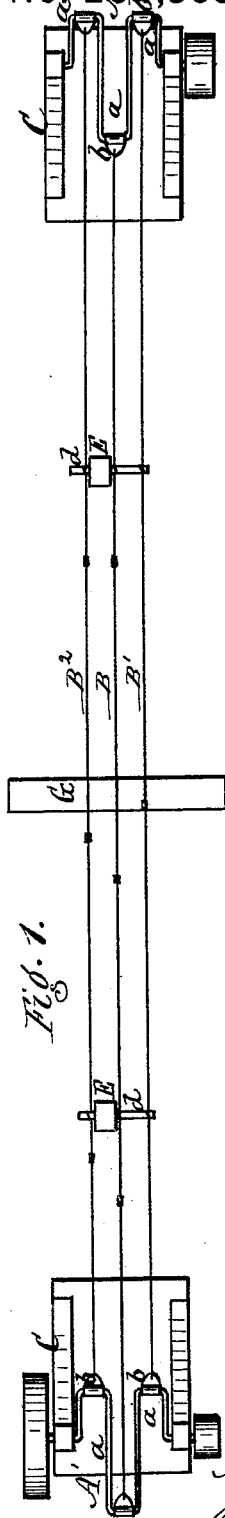
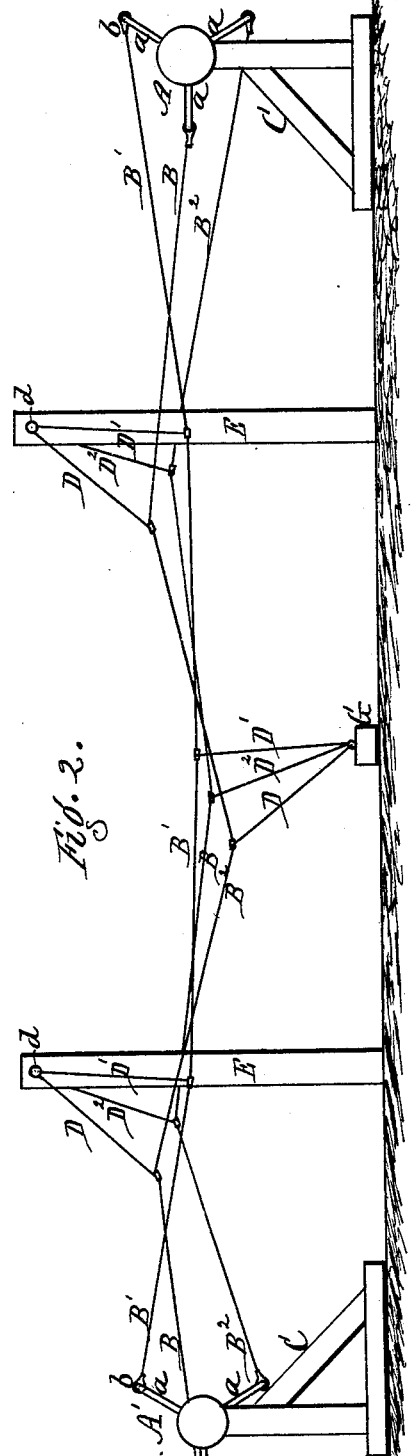
Attest.
R. E. White
H. H. Barnard.
Inventor:
John W. Hawley
pr R. F. Osgood
Atty.

2 Sheets—Sheet 2.
J. W. HAWLEY.
Apparatus for Transferring Power.
No. 204,568. Patented June 4, 1878.
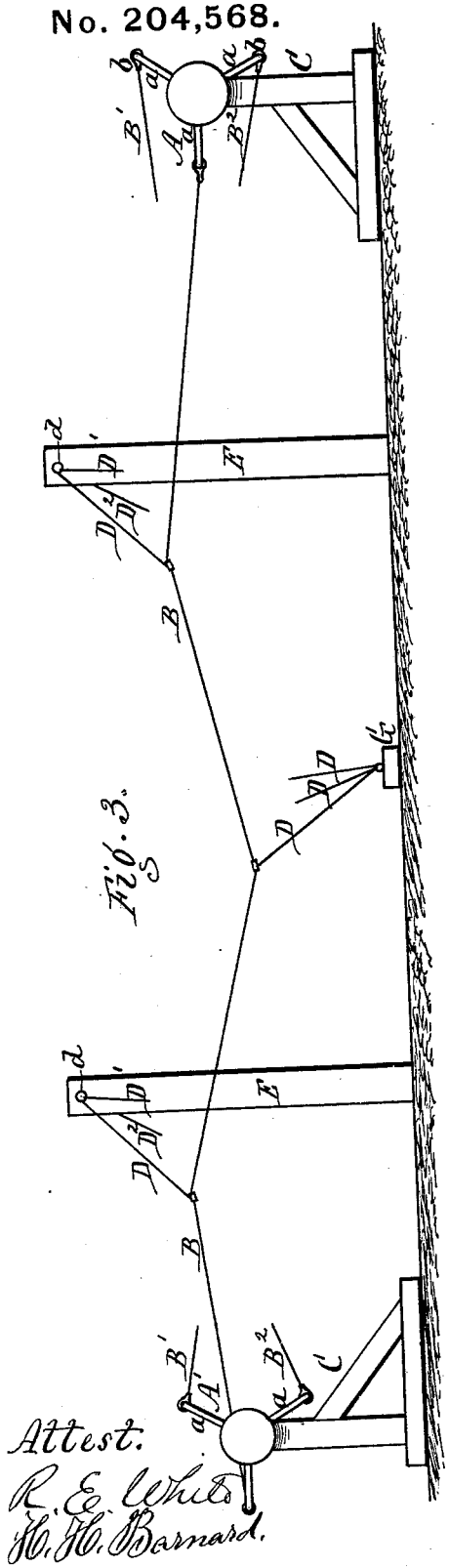
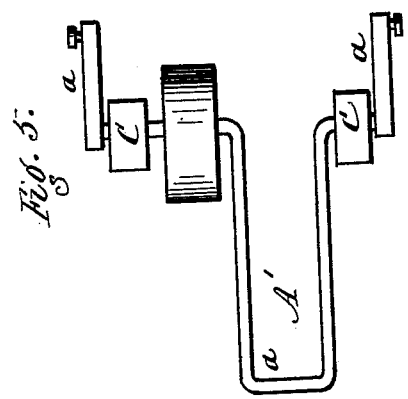
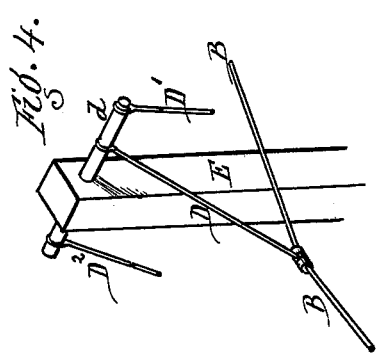
Attest:
R. E. White
H. H. Barnard.
Inventor.
John W. Hawley,
pr R. F. Osgood,
Atty.

UNITED STATES PATENT OFFICE.

JOHN W. HAWLEY, OF WARSAW, NEW YORK.

IMPROVEMENT IN APPARATUS FOR TRANSFERRING POWER.

Specification forming part of Letters Patent No. 204,568, dated June 4, 1878; application filed April 13, 1878.

*To all whom it may concern:*

Be it known that I, JOHN W. HAWLEY, of Warsaw, in the county of Wyoming and State of New York, have invented a certain new and useful Improvement in Apparatus for Transferring Power; and I do hereby declare that the following is a full, clear, and exact description of the construction and operation of the same, reference being had to the accompanying drawings, in which—

Figure 1 is a plan of my improvement. Fig. 2 is a side elevation. Fig. 3 is a view similar to Fig. 2, but showing a portion of the wires removed for clearness of illustration. Fig. 4 is a detail view. Fig. 5 is a modification.

My improvement relates to a device by which power may be transferred a long distance, said device consisting, essentially, of cranks located at the point where the power is applied and at the terminus where it is transferred, with wires, cables, or other connections connecting said cranks, whereby when one crank is turned the other will be turned also through the medium of said connections.

It further consists in combining, with said cranks and wires, tension or take-up wires, arms, or other connections, by which the slack of the operating-wires is taken up or compensated for.

In the drawings, A A' represent the two cranks at the opposite ends of the line through which the power is transferred. B B$^1$ B$^2$ are the operating or transferring wires, of which three are employed.

Each of the crank devices A has three crank-arms, $a\ a\ a$, arranged equidistant from each other in a circle, and to these arms the ends of the wires B B$^1$ B$^2$ are connected by a joint or swivel, $b$, so as to allow a free turning movement. The wires are so connected to the cranks that when the crank A, at the prime end of the line, is revolved, a corresponding motion will be imparted to the other crank, A', at the transferring end, which can be done by properly adjusting the wires and making them of proper length. The cranks A A' may have all the crank-arms in the center and the pulley outside, as shown in Figs. 1 and 2; or one of the crank-arms and the pulley may be in the center and the other two crank-arms may be on the outside, as shown in Fig. 5; or the cranks may be arranged in any other desired way. The cranks A A' are mounted in standards or frames C C of any suitable construction.

D D$^1$ D$^2$ are tension or take-up wires or arms, which act auxiliary to the main transferring-wires, to take up or compensate for the slack of the said main wires as the cranks are turned. They are attached alternately in sets above and below the main wires—that is, one set is attached above said wires by being hung to arms $d\ d$ of posts E, or in some equivalent way, while the next set are attached below said wires by being connected with a timber, G, resting on the ground, or in some equivalent way. The permanent or fixed ends of these wires or arms are attached to their supports in any desired way, but preferably by joints or pivots, so that there will be no danger of breakage. The swinging ends are attached to the main wires by means of a slide or clasp with a set-screw, or by some other equivalent device, so that they may be adjusted and the point of attachment be changed to compensate for expansion and contraction of the main wires, or for other purposes. Three of the main or transferring wires are preferably employed, as before described, the third wire being principally for throwing the cranks past the dead-center; but two may be made effective; and I do not wish to confine myself to the number of wires used. The number of the supporting wires or arms D D may be greater or less, according to the distance to be traversed or the weight to be supported. By alternating them, or placing them one set above and the other set below the main wires, it will be seen they strain the main wires in opposite directions and take up the slack very effectively.

By means of the arrangement above described power can be transferred to very great distances, the turning of one crank by the other depending simply upon the tension or strength of the main wires; and, as these wires are supported at intervals by the take-up or supporting wires, the weight of the main wires in no wise produces strain upon their strength. If desired, in long distances, intermediate cranks may be employed; and the arrangement is such that deflections from a right line may be made, either vertically or laterally, it only being necessary to set the supports of the take-up wires or arms higher or lower, or to the right or left. In this manner the power may be transferred up chasms or over buildings or around impediments, enabling the power to be utilized in the most effective manner. The only means of transferring power long distances with which I am acquainted is by an endless cable passing round pulleys or drums; but the length is limited by the weight of the cable, and the cable soon wears out.

In case of horizontal deflection, or making a curve in the line, the take-up wires or arms are alternated, as before described; but those attached beneath the main wires ordinarily are turned horizontally outward, while those used above the main wires are used in the ordinary way, except the posts to which they are attached are set somewhat angling toward the angle to be made.

In this invention there is no friction of the main wires in moving back and forward, and they are self-acting in tension, since they fall of their own weight as the take-up wires release.

I contemplate using jaws or some equivalent device to hold the ends of the main wires at their connection with the cranks, which will allow said wires adjustment in and out.

Having thus described my invention, I do not claim stiff arms or pitmen connecting two cranks and transferring motion one to the other; but

I claim—

1. In an apparatus for transferring power, the combination of the cranks A A' and the connecting-wires B B$^1$ B$^2$, having suitable tension devices connected with the said wires, the whole arranged as described, so that power imparted to one crank will be transmitted through said wires to the other crank, as and for the purpose specified.

2. The combination, with the cranks A A' at the ends of the line, and with the wires B B$^1$ B$^2$ connecting said cranks, of the tension wires or rods D D$^1$ D$^2$, arranged to take up the slack and to support the main wires, as herein described.

3. In combination with the main wires B B$^1$ B$^2$, connecting the cranks A A', the tension wires or rods D D$^1$ D$^2$, arranged in sets alternately above and below the main wires, whereby one set opposes the other in straining the main wires, as herein shown and described.

In witness whereof I have hereunto signed my name in the presence of two subscribing witnesses.

JOHN W. HAWLEY.

Witnesses:
 R. F. OSGOOD,
 JACOB SPAHN.